United States Patent
Ballard et al.

(10) Patent No.: US 12,535,208 B2
(45) Date of Patent: Jan. 27, 2026

(54) STEAM GENERATOR FOR FUEL CELL SYSTEM

(71) Applicant: Ceres Intellectual Property Company Limited, Horsham (GB)

(72) Inventors: Andrew Ballard, Horsham (GB); Colin Bennett, Horsham (GB); Joshua Ryley, Horsham (GB); Martin Schmidt, Horsham (GB); Oliver Postlethwaite, Horsham (GB); Paul Barnard, Horsham (GB); Simone Dozio, Horsham (GB); Tomasz Domanski, Horsham (GB)

(73) Assignee: Ceres Intellectual Property Company Limited, West Sussex (GB)

( * ) Notice: Subject to any disclaimer, the term of this patent is extended or adjusted under 35 U.S.C. 154(b) by 969 days.

(21) Appl. No.: 17/639,290

(22) PCT Filed: Aug. 26, 2020

(86) PCT No.: PCT/EP2020/073879
§ 371 (c)(1),
(2) Date: Feb. 28, 2022

(87) PCT Pub. No.: WO2021/037928
PCT Pub. Date: Mar. 4, 2021

(65) Prior Publication Data
US 2022/0316698 A1    Oct. 6, 2022

(30) Foreign Application Priority Data
Aug. 28, 2019    (GB) ..................... 1912346

(51) Int. Cl.
F22B 27/16    (2006.01)
F22B 1/18     (2006.01)
(Continued)

(52) U.S. Cl.
CPC ............ *F22B 27/16* (2013.01); *F22B 1/1892* (2013.01); *F22B 37/228* (2013.01);
(Continued)

(58) Field of Classification Search
CPC . F28D 5/00; F28D 7/1607; F28D 7/16; F28D 9/0006; F28D 5/02; F28D 3/04;
(Continued)

(56) References Cited

U.S. PATENT DOCUMENTS 4,242,881 A * 1/1981 Williams ................. F28D 7/14
                                                            62/399
4,321,760 A * 3/1982 Meier ....................... B05D 1/26
                                                          239/590.5

(Continued)

FOREIGN PATENT DOCUMENTS

CN    101055089 A    10/2007
CN    102753903 A    10/2012
(Continued)

OTHER PUBLICATIONS

Further Search Report dated Jan. 27, 2021, in British Patent Application No. GB1912346.2.
(Continued)

*Primary Examiner* — Imran Akram
(74) *Attorney, Agent, or Firm* — Potomac Law Group, PLLC

(57) ABSTRACT

A steam generator for a fuel cell system having a heat exchanger (34) with at least one internal heat exchange surface, a water inflow pipe (46), a dripper head (52) with a flow passageway fluidly connected to the water inflow pipe (46). The dripper head (52) extends inside the heat exchanger (52) above the heat exchange surface for feeding water down onto the heat exchange surface for conversion into steam. The dripper head (52) has outlet holes (56)

(Continued)

spaced along the flow passageway and between adjacent outlet (holes 56) the dripper head has a stepped profile on at least its underside to prevent droplets from adjacent holes coalescing. A fuel inflow pipe can have a section mounted coaxially to a part of the water inflow pipe (46). The fuel inflow pipe's section can surround the water inflow pipe's part. In a fuel cell system with a steam generator, the steam generator can include the fuel inflow pipe and a combined steam and fuel outlet and a reformer directly or indirectly connected downstream of the steam generator.

19 Claims, 7 Drawing Sheets

(51) Int. Cl.
  *F22B 37/22* (2006.01)
  *F28F 25/06* (2006.01)
  *H01M 8/04007* (2016.01)
  *H01M 8/0637* (2016.01)

(52) U.S. Cl.
  CPC ..... *H01M 8/04074* (2013.01); *H01M 8/0637* (2013.01); *F28F 25/06* (2013.01)

(58) Field of Classification Search
  CPC ...... F28D 9/005; F28D 15/0233; F28F 25/06; F22B 37/228
  See application file for complete search history.

(56) References Cited

U.S. PATENT DOCUMENTS

| | | | | |
|---|---|---|---|---|
| 4,953,538 | A * | 9/1990 | Richardson | C13B 25/001 127/16 |
| 5,588,596 | A * | 12/1996 | Hartfield | B01D 1/04 239/557 |
| 5,704,415 | A * | 1/1998 | Suzuki | F28F 9/0221 29/890.032 |
| 2004/0197718 | A1 | 10/2004 | Deshpande et al. | |
| 2007/0044949 | A1* | 3/2007 | Ohashi | F28F 9/001 165/151 |
| 2007/0193533 | A1 | 8/2007 | Kanda et al. | |
| 2009/0194261 | A1* | 8/2009 | Chang | F28F 13/06 165/109.1 |
| 2013/0200611 | A1* | 8/2013 | Lemee | F28F 9/0253 285/288.1 |
| 2013/0220578 | A1* | 8/2013 | Okumura | B05B 1/265 165/104.14 |
| 2013/0269916 | A1* | 10/2013 | Schreiber | B01D 1/04 165/160 |
| 2014/0231058 | A1* | 8/2014 | Nakamura | F28D 5/02 165/177 |
| 2018/0287176 | A1 | 10/2018 | Suehiro et al. | |
| 2019/0093967 | A1* | 3/2019 | Baxter | F28F 25/06 |
| 2019/0214665 | A1 | 7/2019 | Yokoo et al. | |
| 2020/0116389 | A1* | 4/2020 | Kimura | F28F 1/325 |
| 2022/0065543 | A1* | 3/2022 | Seo | F28F 9/0212 |

FOREIGN PATENT DOCUMENTS

| | | |
|---|---|---|
| CN | 207 162504 U | 3/2018 |
| CN | 209459457 U | 10/2019 |
| EP | 3070775 A1 | 9/2016 |
| JP | S52-077414 U1 | 12/1977 |
| JP | S53-065435 U1 | 6/1978 |
| JP | S56-014652 U | 2/1981 |
| JP | S59-87776 A | 5/1984 |
| JP | H03-267602 A | 11/1991 |
| JP | 2003-336802 A | 11/2003 |
| JP | 2007170700 A | 7/2007 |
| JP | WO2017217434 A1 | 3/2019 |
| KR | 10-2013-0046749 | 5/2013 |
| KR | 10-2018-0038021 A | 4/2018 |
| WO | WO-2006/010212 A1 | 2/2006 |

OTHER PUBLICATIONS

Office Action issued May 11, 2023, in Canadian Patent Application No. 3,149,124.
Office Action issued May 15, 2024, in Canadian Patent Application No. 3,149,124.
International Preliminary Report on Patentability issued Mar. 10, 2022, in International Patent Application No. PCT/EP2020/073879.
Office Action issued Sep. 2, 2024, in Japanese Patent Application No. 2022-513324.
International Search Report issued Apr. 12, 2020, in International Patent Application No. PCT/EP2020/073879.
Combined Search and Examination Report issued Jan. 28, 2021, in British Patent Application No. GB2013338.5.
Combined Search and Examination Report issued Feb. 26, 2020, in British Patent Application No. GB1912346.2.
Office Action issued Feb. 25, 2025, in Korean Patent Application No. 10-2022-7008226.
Office Action issued Dec. 27, 2024, in Chinese Patent Application No. 202080060736.1 (partial translation provided).
Decision to Grant issued Jan. 21, 2025, in Japanese Patent Application No. 2022-513324.

* cited by examiner

STEAM GENERATOR FOR FUEL CELL SYSTEM

The present invention relates to a steam generator for a fuel cell system, a fuel cell system comprising the steam generator or steam fuel heater and a method of generating steam or heated steam and fuel, using the steam generator.

Fuel cell systems typically comprise a fuel cell stack, a reformer to fully or partially reform inlet fuel (to enable hydrogen or syngas (reformate) to be supplied to the fuel cell stack) and a steam generator to feed steam and fuel to the reformer. The reformate, once supplied to the stack, along with an oxidant, each on either side of electrochemically active layers of the fuel cells within the fuel cell stack, undergoes an electrochemical reaction to produce both heat (hot outflow gas) and electricity.

In many fuel cell systems, the generated heat is used to operate both the steam generator and the reformer via heat exchangers.

In some fuel cell systems, a separate reformer is absent—with the reforming occurring instead within the stack.

The amount of electricity generated from the fuel cell stack needs to be controllable. To increase electrical output, more fuel or reformate needs to be supplied to the fuel cell stack, or the operating conditions within the stack need to be altered (e.g. to increase the efficiency thereof). For the former approach, it is important to ensure that the fuel or reformate is supplied without excessive pressure pulsations and with a consistent ratio of fuel to steam, without wide temperature variations. Furthermore, it is preferred that the reformate or fuel be supplied at controllable rates, changeable on demand, with minimal time lag. To achieve this, the reformer, where present, needs to be supplied with heated fuel and steam with minimal pressure pulsations and no time lag. The present invention is therefore concerned with the provision of an improved steam generator for achieving controllable and homogeneous delivery of fuel/steam mix to the reformer or fuel cell stack to best enable minimal fluctuations in stack voltage due to fuel side compositional or pressure changes.

According to the present invention, there is provided a steam generator for a fuel cell system, comprising:
- a heat exchanger with at least one internal heat exchange surface,
- a water inflow pipe,
- a dripper head comprising a flow passageway fluidly connected to the water inflow pipe, which dripper head extends inside the heat exchanger above the heat exchange surface for feeding water down onto the heat exchange surface for conversion into steam;
- wherein the dripper head comprises a plurality of outlet holes spaced along the length of the flow passageway; and
- wherein between adjacent outlet holes the dripper head has a stepped profile on at least its underside, when viewed in cross-section, to prevent droplets from adjacent holes coalescing.

By "stepped profile on at least its underside" it is meant that there are stepped surfaces on at least the lower half of the dripper head at different heights. Stepped surfaces or steps (e.g. levels delineated by corners or shoulders) encourage surface tension effects that can prevent droplets from spreading beyond a step surface—for example, a droplet will not tend to climb upwards due to gravitational pull against it when it is held as a droplet by surface tension.

The corners or shoulders may include a convex corner or shoulder, and are preferably sharp corners or shoulders. They can be formed by the intersection of two (preferably planar) surfaces—a lower surface (a radially outer surface) and a rising surface (e.g. a surface extending "upwards"—towards the axis of the dripper head from the lower surface, up which the droplets will not tend to climb due to gravity tending to keep the droplets on the lower surface).

A lower surface may have an inner shoulder—nearest the hole, and an outer shoulder—facing away from the hole. It may then have two convex corners. The water droplet will form against the inner shoulder as it exits the hole, and may grow over the lower surface, before reaching the outer shoulder. The droplet, however, will tend not to spread much beyond the outer shoulder due to the rising surface extending upwards from that outer shoulder forming a gravity barrier to such progression.

In other embodiments the hole may be in the lower surface, whereby there may be a single convex shoulder to the side of the lower surface—facing away from the hole. That single convex shoulder may be annular around the hole, or it may be one of a pair of shoulders on either side of the hole, spaced along the axis of the dripper head.

Although in practice the or each convex intersection, corner or shoulder may be rounded, it is preferred to be substantially angular, i.e. sharp. However, the intersection may be more or less rounded. The angularity, or sharpness, of the intersection (i.e. of the corner or shoulder) may be defined by the radius of curvature of the intersection/corner/shoulder in cross section, or by its perceived sharpness—i.e. looking like a line of intersection, rather than a curved corner (in section). Where it can be perceived as having a radius, ideally it will still have a radius in section of less than 0.5 mm. However, a more rounded intersection, corner or shoulder can instead be provided, e.g. a radius (in cross section) of up to half the diameter or longest width of the hole with which it is associated.

Alternatively, it may have a radius of up to 40% of the height of the step, as measured perpendicular to the axis of the dripper head (or parallel to the axis of the hole). More preferably though the radius of the intersection, corner or shoulder will be no more than 20% of that height, or even no more than 10% or 5% of that height.

The step surfaces may be of a selected size and shape to permit growth of a droplet to a suitable size such that steam generation is controlled and responsive, but while preventing excessive droplet size, to thus prevent or minimise the likelihood of any coalescence between droplets from neighbouring holes. This may also be controlled by requiring a selected range of water flow rates and a selected hole size.

In use, the holes are preferably selectively positioned laterally along the dripper head, or within the heat exchanger, to be positioned above the respective heat exchange surfaces onto which the droplets are desired to be dropped, i.e. the holes are positioned such that the heat exchange surfaces are below the holes, thus enabling a dripping of the droplets directly onto the heat exchange surfaces.

The holes are provided to present droplets of water, and as such typically have a diameter of at least 0.2 mm, and more preferably a diameter of at least 0.3 mm. The droplets formed therewith will be larger than the hole diameter, and thus are typically at least 0.5 mm wide as they fall under gravity from the hole(s) towards the heat exchange surface for conversion into steam, and more commonly at least 1 mm wide. The droplets are not an atomised spray of water. Neither are the droplets steam. (The head with the outlet holes is a dripper head, after all, not an atomiser or spray nozzle, whereby water drips from it, under the influence of gravity, as a liquid not a gas, and as drips not a spray.)

The stepped profile between adjacent outlet holes may comprise at least two step surfaces at different heights above the heat exchange surface. Usually, the adjacent outlet holes are each provided on a step surface, with at least one step surface between those surfaces that is at a different height above the heat exchange surface. Usually the adjacent outlet holes are each provided on a step surface at the same height above the heat exchange surface.

In addition to the convex intersections, corners or shoulders, there can be concave corners or intersections defining an upper surface extending generally parallel to the axis of the dripper head between adjacent holes. The concave corners may likewise be sharp or angular, or radiused, similar to the convex intersections, corners or shoulders, either with the same angularity or radius in cross section to the neighbouring convex intersection, corner or shoulder or with a different radius or angularity in section. Preferably though it would fall within similar radius limits.

In most examples the length of the upper surface spans between opposing rising surfaces of adjacent steps of adjacent holes in the dripper head. That span defines a gap (usually >2 mm or >3 mm) between opposing rising surfaces of adjacent steps.

The upper surface may comprise one or more planar surfaces, or it may be curved around the axis of the dripper head.

Preferably the height of each step is measured perpendicularly from its upper surface to its lower surface—perpendicular to the axis of the dripper head. Where the upper or lower surfaces are curved around the axis of the dripper head, the height is measured through a sagittal plane of the dripper head that extends through the centreline of the respective hole. Preferably the height is greater than the diameter of the hole. More preferably the height is at least 2× or 3× the diameter of the hole.

The length of the gap between opposing rising surfaces of adjacent steps of adjacent holes measured at a middle height of the rising surfaces (midway between the upper and lower surfaces), parallel to the axis of the dripper head, is preferably equal to or greater than the height of the shorter of the two steps at the ends of the gap, although preferably the two steps have the same height Again this may be measured in that sagittal plane if the surfaces have curvatures around the axis of the dripper head. More preferably the gap is at least 2× or 3× the height of the shorter of the two steps at the ends of the gap.

With these dimensions for the steps, the profile and spacings between stepped surfaces will tend to minimise or eliminate coalescence of droplets between adjacent holes. The droplets will thus tend to fall from the dripper head vertically downward below the holes, in use.

Usually the dripper head is elongate with a flow passageway comprising holes spaced axially along its length.

In one embodiment, the adjacent outlet holes are each provided on a step surface which forms part of a structure that projects outwardly towards the heat exchange surface below. The step surface may optionally be of a selected size and shape to encourage growth of a droplet of a suitable size.

The structure may comprise a minor passageway extending laterally away from the flow passageway and leading to the outlet hole on the step surface. The minor passageway may be threaded so as to receive a hollow screw with a bore of a diameter selected so as to provide a desired cross-section and hence flow rate. The hole size can thus be changed or selected by use of specific hollow screws.

The adjacent outlet holes may be provided in respective projecting structures formed integrally with the dripper head and separated from each other by grooves or channels.

Alternatively, the structure may be a peg—i.e. a cylindrical shape with a generally flat bottom with the hole in the bottom, and the shoulder being around the edge of the bottom.

Alternatively, each outlet hole may be segregated from an adjacent outlet hole by at least one baffle that projects outwardly relative to the outlet hole. The term baffle is used to mean a projecting structure or (e.g. lateral) partition that restrains the flow of a liquid, for example, so as to prevent it spreading in a particular direction. The baffle may be a narrow or wide structure or partition with corners/shoulders as defined above.

By the provision of the segregation of the adjacent holes, water droplets from the outlet holes, provided into the heat exchanger, may be of a controlled size, located at the correct positions (above the heat exchange surfaces), all within acceptable parameters, to ensure the evaporation of the water stream onto the heat exchange surface occurs in a continuous and steady regime in order to reduce or minimise pressure pulsations in the steam-fuel stream output from the heated steam (and optionally fuel gas) outflow port of the heat exchanger.

As described previously, the controlled water droplet size is preferably at least 0.5 mm across (i.e. preferred minimum droplet size) as it drops under the influence of gravity towards the heat exchange surface, and more preferably at least 1 mm across—i.e. having a diameter (at its widest point) of at least 0.5 mm or more preferably at least 1 mm.

Preferably each outlet hole is segregated from an adjacent hole by a respective associated pair of baffles arranged axially along the dripper head on either side of each hole. Those baffles are preferably spaced apart to define at least a 2 mm gap between them, in which water can collect to form droplets.

In embodiments where the outlet holes are sufficiently closely spaced, the dripper head may comprise outlet holes and baffles, or steps, arranged alternately at spaced axial intervals along the dripper head, such that only a single baffle or step is provided between adjacent holes. Preferably though there are two spaced baffles between adjacent holes to create a series of steps, and to create a space or gap between adjacent baffles, between holes. This further helps to prevent drips from adjacent outlet holes from merging together, or otherwise interacting with one another to form pools of liquid within the heat exchanger—if water can pool, it will evaporate more slowly, which under transient inlet flow conditions would lead to a delayed response of steam flow rate out of the steam generator. It can also cause the droplets to drip away from the intended heat exchange surface. It can also allow the water to collect during or after a shutdown event, as it will not so readily evaporate beforehand, which can cause difficulties when restarting the fuel cell system, or even localised oxidisation or deposits (after evaporation), leading to maintenance issues. A steady dripping of droplets from each outlet is therefore intended, rather than a coalescence of water at the dripper head between neighbouring outlet holes, the latter of which can lead to irregular or uncontrolled drips, and thus excessive pooling on the heat exchanger, rather than the desired, controlled, droplets of water.

Pooling can be a particular problem if it occurs towards the base of the heat exchanger—where the hot gas first enters the heat exchanger, as it can result in unsteady water boiling, leading to undesirable, and significant, pressure pulsations in the steam outflow. Avoiding large water droplets is thus important. This is particularly the case as due to gravity, any unboiled water will naturally collect at the base of the heat exchanger.

The projecting structure, baffle or step that outwardly projects relative to the outlet hole can be an integral structure or a fitted structure. It preferably defines a (e.g. arc shaped) shoulder that lies laterally spaced from the outlet hole. It can be formed from a flange or a washer, or a groove in the wall of the dripper head, with the outlet hole positioned in the recess formed by the groove.

The dripper head may be machined and thus the groove may be cut into the wall of the dripper head, or the structure may be fabricated onto or integrally formed on the dripper head.

The structure may extend partially around the circumference or periphery of the dripper head or all the way around. Extending all the way around offers a lower possibility for the water to pool across multiple outlet holes as each drop is contained vertically and horizontally.

The outlet holes preferably extend radially relative to a longitudinal axis of the dripper head. Ideally, they point downward.

The dripper head can be a removable or replaceable component—preferably screw-fitted onto an end of the water inflow pipe, or to a connector at the end thereof.

The dripper head generally comprises two or more outlet holes at spaced axial intervals along the dripper head, with each outlet hole being segregated from an adjacent hole by a respective associated pair of partitions arranged axially along the dripper head on either side of each hole, such that at least two partitions are provided between adjacent holes. By the provision of two partitions between adjacent holes, water will not pool over and past the outer edges of the partitions in a manner to interact with a corresponding pooling from an adjacent hole—the gap between the adjacent partitions separates any such pooling.

The heat exchange surface may be a plate or tubular surface of the heat exchanger. There can additionally be provided fins or other non-flat members extending within the heat exchanger, and typically extending from the plate or tubular surface within the heat exchanger. For example, there can be lanced offset fin arrangements within the heat exchanger. These, help avoid any straight-through paths within the water/steam passageway of the steam generator. Therefore, as the water descends, even if not evaporated quickly upon hitting the heat exchange surface immediately below the outlet holes, multiple sites and surfaces are presented within the heat exchanger for heat transfer to the water for evaporation thereof to occur before pooling can occur at the base of the heat exchanger.

Preferably the steam generator also has a fuel inflow pipe for allowing fuel to be fed into the steam generator for mixing with the steam so that the outflowing steam is heated steam fuel gas suitable for feeding either to a reformer or directly to the fuel cell stack. Preferably a gaseous fuel is fed into the steam generator with the water. It may surround the water inflow pipe.

Droplets from the dripper head form at a desired or controllable rate from the outlet holes. They may be controlled by the water feed pressure or by a flow control valve—by being variable, different steam supply rates can be achieved out from the steam generator. The water is still liquid water when it arrives at the outlet hole—that is there is active control of the conditions to avoid premature formation of steam (i.e. prior to dripping from the dripper nozzle onto the heat exchange surface). The invention aims to provide controlled drips of a certain regularity and size out from the dripper head's outlet holes for achieving the desired steam output from the steam generator. The water thus arrives at the outlet holes as liquid water and also leaves the dripper head as a liquid water droplet such that it falls under gravity to the heat exchange surface below the dripper head. The present invention thus does not vent steam or an atomised spray from the dripper head or outlet holes, but instead drips droplets that will fall under the influence of gravity.

The outlet holes are provided at spaced axial positions along the lower half or underside of the dripper head. Gravity thus helps to avoid pooling of the droplets between outlet holes.

The partitioning structures either side of the outlet holes can form a gap around the full circumference of the dripper head—preferably it is an annular gap.

At least one of the partitioning structures may have an annular form around the dripper head.

Both partitioning structures, on either side of at least one of the outlet holes, may have an annular form around the dripper head.

The partitioning structure can have a height extending in the radially outward direction relative to a longitudinal axis of the dripper head that is higher than the width of the partitioning structure.

The partitioning structure or baffle may comprise a separate component mounted on the dripper head.

The dripper head may comprise a tubular end section, and the pair of partitioning structures may comprise a pair of washers mounted on the tubular end section, one being proximal of the outlet hole and the other being distal of the outlet hole, relative to the tubular end section. This simple structure is very cost effective.

Preferably the washers are press-fit onto the tubular end section. This minimises the gap between the outside of the tubular end section and the inside of the washers, thus minimising the opportunity for water to leak between them, which leaking water could facilitate pooling of the water between adjacent outflow holes.

Preferably the pair of partitioning structures are formed integrally, e.g. as integral flanges or shoulders, with the tubular end section.

The structures may define parallel sidewalls between which the water is fed from its outlet hole during use of the steam generator.

In some embodiments, the parallel side walls are perpendicular to a longitudinal axis of the nozzle.

Usually just one outlet hole is provided between each pair of parallel side walls.

In some embodiments, the dripper head is a one-piece structure.

To allow water to be fed through the dripper head, the dripper head has a central bore fluidly connected to both the water inflow pipe and the outlet hole. As the end is preferred not to be an outlet hole, the dripper head generally has a closed distal end.

Where the structures are formed by a lateral cut or groove in a side of the dripper head and the outlet hole is at the base of the lateral cut or groove, the partitions may define arc shaped shoulders either side of the outlet hole.

The sidewalls need not be parallel—in some embodiments they taper outwardly to be wider at the outside.

The dripper head may have a hexagonal section along at least a part of its length, and preferably has a threaded bore at its proximal end—to facilitate attachment of the nozzle to an end of the water inflow pipe.

Preferably the steam generator has a steam outlet connected to a reformer of the fuel cell system.

Preferably the steam outlet is at or near the bottom of the heat exchanger and the dripper head is installed within the heat exchanger at or near the top of the heat exchanger.

Preferably fuel is combined with the steam in the steam generator.

In some embodiments, the steam generator is a combined steam generator and fuel heater for the fuel cell system (e.g. a steam fuel heater in which steam and fuel are mixed and heated).

Preferably the fuel cell system is a solid oxide fuel cell system. Preferably it has at least one stack of fuel cells within it. Preferably at least one of the stacks is formed with metal supported solid oxide fuel cells. The solid oxide fuel cells, or stack thereof, may be as described in WO2015136295, the entire contents of which are incorporated herein purely by way of reference.

In some embodiments, the fuel inflow pipe has a section mounted coaxially to a part of the water inflow pipe. Preferably the fluid (fuel) inflow pipe's section surrounds the water inflow pipe's part. Preferably, this arrangement is provided at the point of entry of both pipes into the steam generator.

The section and part may be located at or adjacent to, or to extend fuel and water flow through, an outside wall of the heat exchanger. Usually the water inflow pipe is mounted perpendicular to an outside wall of the heat exchanger. Likewise, the fuel inflow pipe is usually mounted perpendicular to an outside wall of the heat exchanger.

Combining the fuel and water inflows allows a preferred arrangement to be provided.

According to this aspect of the present invention there is provided a steam generator for a fuel cell system, comprising:
  a heat exchanger with at least one internal heat exchange surface,
  a water inflow pipe,
  a fuel inflow pipe, and
  a dripper head fluidly connected to the water inflow pipe, which dripper head extends inside the heat exchanger above the heat exchange surface for feeding water down onto the heat exchange surface for conversion into steam;
  wherein the fuel inflow pipe has a section that surrounds a part of the water inflow pipe at or adjacent to, and to extend through, an outside wall of the heat exchanger such that the fuel inflow pipe's section, and the fuel therein during use, acts to insulate the surrounded part of the water inflow pipe from the heat of the heat exchanger.

This steam generator may also have the same features as the steam generator of the first aspect of the present invention.

The present invention also provides a fuel cell system comprising a fuel cell stack, a fuel inflow pipe, a water inflow pipe, an air or oxidant inflow pipe, a combined steam generator and fuel heater connected to the fuel inflow pipe and the water inflow pipe, an optional reformer connected to the combined steam generator and fuel heater for providing hydrogen or syngas to the fuel cell stack, and a heat exchanger for taking heated fluid directly or indirectly from an outflow of the fuel cell stack, the heat being used to heat at least one internal heat exchange surface of the heat exchanger, wherein the at least one internal heat exchange surface is used to generate steam from water from the water inflow pipe via a dripper head, the combined steam generator and fuel heater being a steam generator as defined above, comprising both a fuel inflow pipe and a water inflow pipe, and wherein the fuel mixes with the steam in the steam generator and is heated.

The heated fluid might be fuel electrode gas or air electrode gas from the stack.

According to another aspect of the present invention there is disclosed the use of the above fuel cell system to minimise fluctuations in stack voltage due to fuel side compositional or pressure changes in an incoming fuel/steam mix to the fuel cell stack of the fuel cell system.

The present invention also provides a method of generating steam using a steam generator as defined above, wherein, water is fed through the water inflow pipe and the dripper head to the heat exchange surface whereupon the water converts to steam. Preferably the method minimises pressure pulsations in the produced steam through the controlling of the droplet size from the dripper head using the dripper head as defined above.

Additionally, this may be achieved by locating the drips over the heat exchanger surface by use (e.g. by selective positioning) of the dripper head with the stepped profile on its underside.

According to the present invention there is also provided a method of minimising pressure pulsations in a steam generator during steam generation, the steam generator comprising a heat exchanger with at least one internal heat exchange surface; a water inflow pipe; a dripper head comprising a flow passageway fluidly connected to the water inflow pipe, which dripper head extends inside the heat exchanger above the heat exchange surface for feeding water droplets down onto the heat exchange surface for conversion into steam; wherein the dripper head comprises a plurality of outlet holes spaced along the length of the flow passageway; and wherein between adjacent outlet holes the dripper head has a stepped profile on at least its underside, when viewed in cross-section, the method comprising adjusting the flow rate of the water to a selected flow rate whereby the stepped profile (together, for example, with the selected hole size) prevents droplets from adjacent holes coalescing.

The stepped profile may have corners or shoulders as defined above.

Where the dripper head has a longitudinal axis, the cross section for the stepped profile is through a vertical sagittal plane of the dripper head, extending through the longitudinal axis.

The stepped profile provides a rising surface up which water droplets will not tend to rise, whereby water droplets on adjacent rising surfaces will not interact, and thus they cannot coalesce.

Preferably the holes of the dripper head are located vertically above respective heat exchange surfaces of the heat exchanger for rapid evaporation of the droplets upon them landing on those heat exchanger surfaces.

Optionally, concurrently fuel is fed through the fuel inflow pipe and into the heat exchanger, wherein the fuel mixes with the steam in the heat exchanger and is heated.

In a yet further aspect there is provided a steam generator for a fuel cell system, comprising:
  a heat exchanger with at least one internal heat exchange surface,
  a water inflow pipe, and
  a dripper head fluidly connected to the water inflow pipe, which dripper head extends inside the heat exchanger above the heat exchange surface for feeding water down onto the heat exchange surface for conversion into steam;

wherein the dripper head comprises a plurality of lateral outlet holes spaced axially along the dripper head, each hole being segregated from an adjacent hole by at least one structure that outwardly projects relative to the lateral outlet hole.

In yet another aspect there is provided a steam generator for a fuel cell system, comprising:

a heat exchanger with at least one internal heat exchange surface, a water inflow pipe, a dripper head comprising a flow passageway fluidly connected to the water inflow pipe, which dripper head extends inside the heat exchanger above the heat exchange surface for feeding water down onto the heat exchange surface for conversion into steam;

wherein the dripper head comprises a plurality of outlet holes spaced along the length of the flow passageway; and the steam generator is configured, in use, such that water emerges from the dripper head outlet holes as water droplets, rather than steam or a spray, which droplets drop under gravity towards the heat exchange surface for conversion into steam;

wherein between adjacent outlet holes the dripper head has a stepped profile on at least its underside, when viewed in cross-section, to prevent droplets from adjacent holes coalescing.

Water droplets from a dripper head fall under the influence of gravity, whereas steam, being a gas, or an atomised spray—acting like a gas due to the tiny size of the particles, and the gas accompanying the spray particles, will tend to stay suspended, or will be powered by the ejection force from the outlet hole (i.e. the flow of the gas accompanying the spray), rather than being mainly affected by the influence of gravity.

The present invention also provides a method of operating a steam generator for a fuel cell system, the steam generator comprising:

a heat exchanger with at least one internal heat exchange surface, a water inflow pipe, a dripper head comprising a flow passageway fluidly connected to the water inflow pipe, which dripper head extends inside the heat exchanger above the heat exchange surface for feeding water down onto the heat exchange surface for conversion into steam;

wherein the dripper head comprises a plurality of outlet holes spaced along the length of the flow passageway, and between adjacent outlet holes the dripper head has a stepped profile on at least its underside, when viewed in cross-section, to prevent droplets from adjacent holes coalescing;

the method comprising:

feeding water through the water inflow pipe to the dripper head; and dripping the water from the dripper head, via the outlet holes, as water droplets, rather than steam or a spray, the water droplets dripping onto the heat exchange surface for conversion into steam.

In some embodiments the steam generator forms part of a fuel cell system and generates steam that is supplied to a fuel cell inlet within the fuel cell system.

With the methods of the present invention, it is intended to ensure that the water is still liquid water when it arrives at the outlet hole, and when it drips onto the heat exchange surface. The method in preferred embodiments thus actively controls the conditions upstream of the dripper head to avoid premature formation of steam. For example, the steam generator may comprise a control system configured to deliver the liquid water to the outlet holes at a suitable temperature and mass flow rate such that the liquid water forms droplets that drop under gravity: for example, this may comprise a controller within the steam generator in operable communication with sensors (e.g. temperature/pressure/flow sensors) and actuators (e.g. control valves and/or mass flow rate controllers, for example) to achieve this. The present invention thus can get controlled drips of a preferred regularity and size: the liquid water arrives at the outlet holes as liquid water and also leaves the dripper head as a sequence of liquid water droplets falling under gravity to the heat exchange surface, whereafter it is converted into steam—by the heat at the heat exchange surface. The present invention thus does not let the water come out of the dripper head as steam. Neither does the present invention let the water come out of the dripper head as an atomised spray (e.g. tiny droplets that don't drop under the influence of gravity).

The present inventors have realised that the dripper head should supply droplets of water which discontinuously form on the dripper head, and then grow until they are large enough to drop or fall under the influence of gravity. This differs from steam, and likewise it differs from an atomised spray in which tiny droplets continuously emerge in a gas-flow as a finely mixed spray of water particles and the supporting gas-flow, which tiny particles are suspended in the gas-flow (usually air), and that thus do not tend to fall under the influence of gravity.

The method of the present invention uses multiple parameters to ensure the droplets are presented. First the outlet holes are provided as dripper holes, not spray holes, and thus have a suitable size and shape for dripping not spraying. Further, the dripper head operates such that water pressure (mass flow delivery rate), water temperature, surrounding heat exchanger air temperature, and air pressure all operate together to generate water droplets that fall under gravity. The method thus avoids the generation of an airborne atomised water spray generation, and likewise avoids the generation of premature steam generation in the dipper head and water inflow pipe, such that the liquid water does not vaporise before it has a chance to drop as a droplet from the dripper head.

These and other features of the present invention will now be described in further detail, purely by way of example, with reference to the accompanying drawings in which:

FIG. 1 schematically illustrates a fuel cell system comprising a steam generator according to the present invention;

FIG. 2 schematically illustrates a first embodiment of a steam generator for the fuel cell system;

FIGS. 8b and 8c show corresponding views of variants of the dripper head of FIG. 8a.

Figure 1:
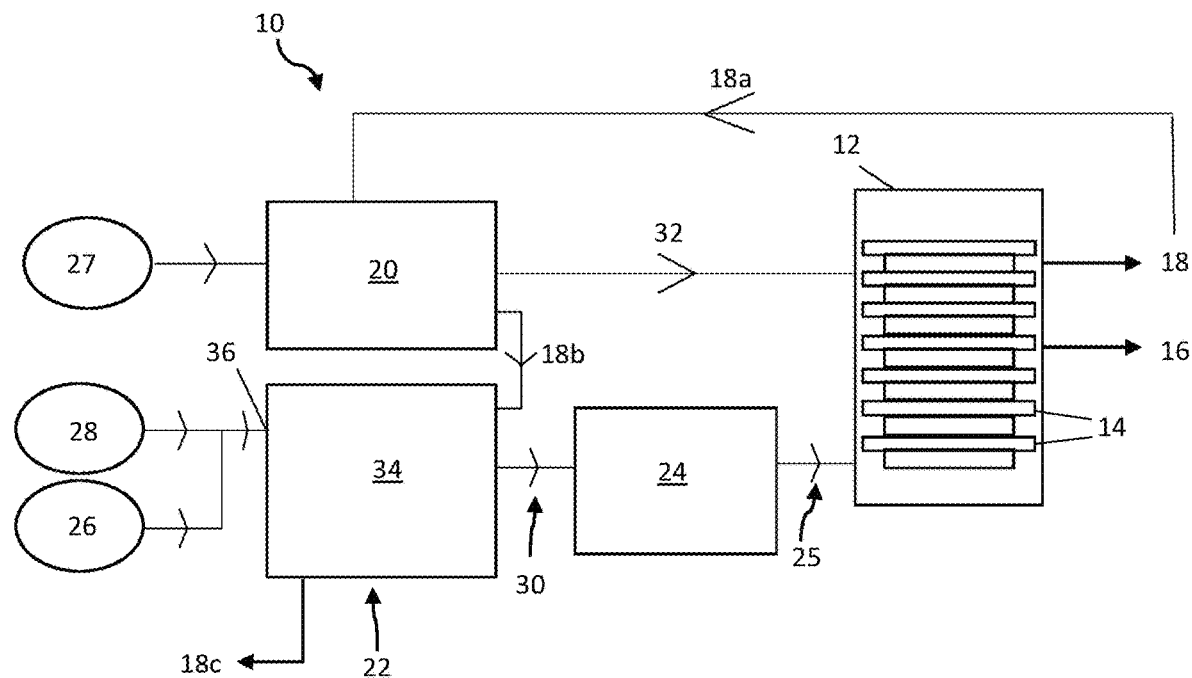

Referring initially to FIG. 1, a basic fuel cell system, for example, a solid oxide fuel cell system, is schematically illustrated. As can be seen, the fuel cell system 10 comprises a stack 12 of fuel cells 14.

The fuel cells have electrochemically active layers and the stack has fuel and oxidant flow paths either side of the electrochemically active layers to allow an electrochemical reaction to occur across the electrochemically active layers so as to produce from the cells, and thus the stack, both electricity 16 and heat, the heat being in the form of heated out-gases 18, which heated out-gases will be a combination of fuel electrode gas and air electrode gas exiting the exhaust of the stack.

The heated out-gases 18 can be used by the fuel cell system 10 for a number of purposes. One of these is to preheat the oxidant that is fed into the stack 12—usually air 27—using an air heater—a first heat exchanger 20. Although the oxidant is usually air, other oxidant gases can be used, such as an oxygen rich gas. Typically, for a solid oxide fuel cell operating at a temperature of between 400 and 600° C., the oxidant 27 will be heated by the first heat exchanger 20 to be output at around 300 to 500° C. As shown, this may be achieved using high grade heat from cathode (oxidant) off-gas 18a after it has left the stack 14.

The heated out-gases 18 can also be used to preheat fuel 26 and water 28 to produce a heated steam and fuel mixture 30. That is, after losing some heat in air heater 20 the cathode (oxidant) off-gas 18b may then transfer lower grade heat to the fuel 26 and water 28. The resulting heated steam and fuel mixture 30 will typically be fed to a reformer 24, although in some fuel cell systems the reforming is carried out in the stack 12. The reforming process will likely be carried out partially in a reformer 24 and then continued in the stack 12 as the outflow from the reformer 24 is commonly only part reformed into syngas 25 (hydrogen and carbon monoxide), it being also mixed with unreformed fuel and steam.

For the purpose of producing the steam and fuel mixture 30, a steam generator 22—a second heat exchanger 34—is provided, which second heat exchanger 34 receives both fuel 26 and water 28 at an inlet end, which water 28 is converted into steam in the steam generator 22, and which fuel 26 becomes entrained in or mixed with the steam and heated, so that the mixture 30 can be output as a heated steam and fuel gas mixture 30. For a solid oxide fuel cell operating at a temperature of between 400 and 600° C., the steam and fuel mixture will be heated by the second heat exchanger 22 to be output at around 200 to 500° C., usually 250 to 350° C. That heated steam and fuel gas mixture 30 is then fed into the reformer 24, which may likewise be heated with the out-gases 18. That reformer 24 then outputs the reformate, or syngas, mixture 25, comprising at least hydrogen and carbon monoxide. That syngas can then be fed into the stack 12 along with the heated air 32 from the first heat exchanger 20 to undergo the electrochemical processing by the fuel cells 14 in the fuel cell stack 12.

In some fuel cell systems, the steam is instead produced first and the fuel is then separately mixed therein, perhaps in the reformer, or in a separate mixing chamber—which may have a further heat exchanger.

In typical fuel cell systems, the fuel is supplied as methane, propane or ethanol.

Further, the water supplied for making the steam can be mains water, or more preferably distilled water as distilled water will form fewer deposits upon evaporation.

The above is merely one arrangement of heat exchangers in a fuel cell system. Heated anode off gases may also pass through heat exchangers for transfer of heat to incoming gases, and heat exchangers could be arranged in other orders. There may even be additional heat exchangers in the fuel cell system for ensuring the heated air and syngas are fed into the stack at the right temperatures, and likewise to ensure that the heat provided to the first and second heat exchangers are appropriate for the required operation of the air heater from the steam generator, and likewise for the reformer.

Figure 2:
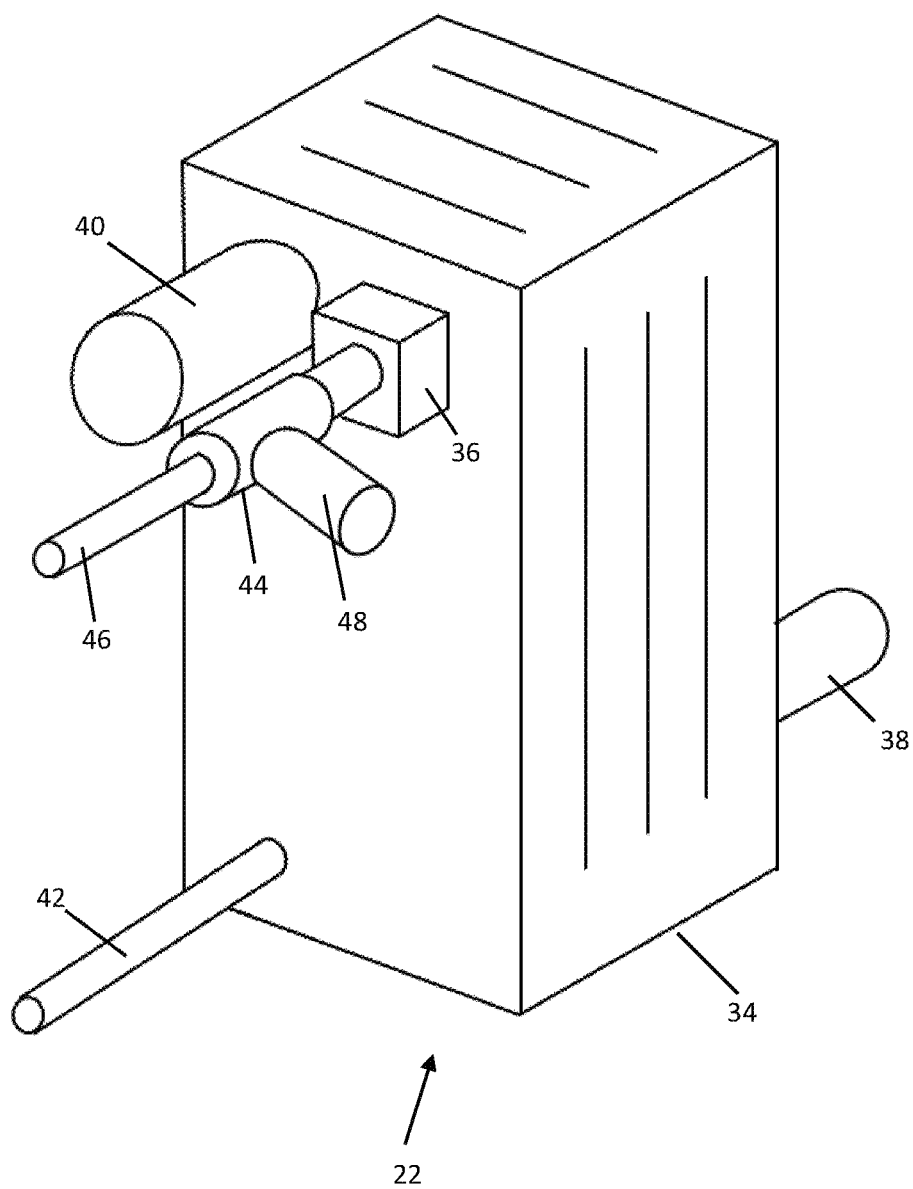

Referring next to FIG. 2, a schematic example of a steam generator 22 is shown. As can be seen, the steam generator 22 comprises a heat exchanger portion 34 with inflow and outflow ports. These include a combined fuel and water inflow port 36, a heat supply fluid inflow port 38, a heat supply fluid outflow port 40 and a heated steam and fuel gas outflow port 42.

The combined fuel and water inflow port 36 can be attached via a manifold onto the side of the heat exchanger portion 34, preferably with an insulated gasket to avoid leaks across the joint and to offer heat shielding from the heat exchanger portion 34 to the manifold. The gasket may be a thermiculite gasket.

Upstream of the combined fuel and water inflow port 36, this embodiment has a T-junction 44, which T-junction 44 has a through-flowing water inflow pipe 46 and a side-ported fuel inflow pipe 48. Because of the T-junction, the water inflow and the fuel inflow can be combined to a single inflow port 36—as will be described in further detail with reference to later embodiments.

As shown, this heat exchanger 34 is a contraflow heat exchanger. This is a preferred arrangement. In the illustrated arrangement the combined fuel and water inflow port 36 is mounted towards the top of the heat exchanger portion 34 and the heated steam and fuel gas outflow port 42 is positioned towards the bottom of the heat exchanger portion 34 such that liquid water enters at the top of the heat exchanger portion and exits as steam out from the bottom of the heat exchanger portion 34, whereas the heat supply inflow port 38 is provided at the bottom of the heat exchanger portion 34 and the heat supply outflow port 40 is provided at the top of the heat exchanger portion 34. Having this counter flow of the heat supply against the direction of flow of the water and steam production offers an efficient operation of the heat exchanger function within the heat exchanger portion 34.

Figure 3:
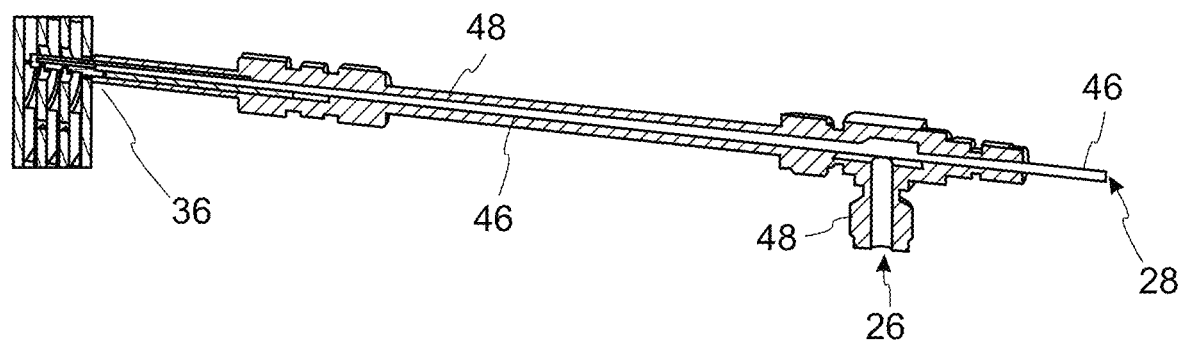
FIG. 3 shows an alternative dripper head arrangement connected to a steam generator.
Figure 4:
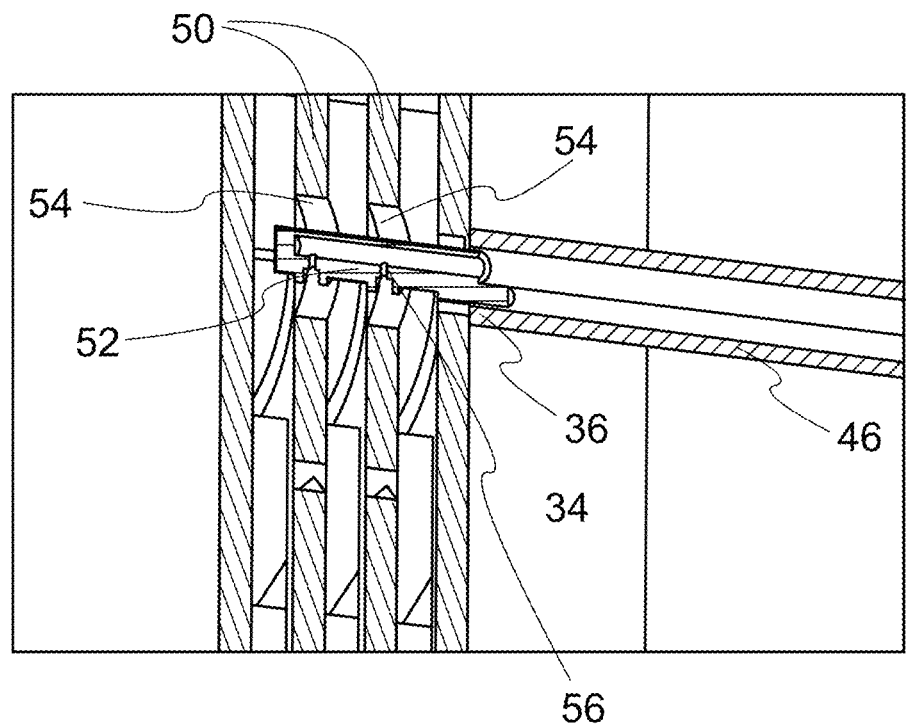
FIG. 4 shows in greater detail the dripper head arrangement of FIG. 3.

Referring next to FIGS. 3 & 4 (an enlarged view), an alternative dripper head arrangement for the steam generator 22 is shown. In this embodiment, the T-junction 44 with the side-ported fuel inflow pipe 48 is further upstream from the steam generator so that a longer length of the water inflow pipe 26 is surrounded by the concentric outer fuel inflow pipe 48. The heat exchanger portion 34 may still have the same contraflow arrangement with the ports in the same position as previously, and the dripper head at the top of the steam generator. However, the figures also show internal heated plates 50 of the heat exchanger 34—heated by the through-flow of the heated out-gases 18. These internal, heated plates 50 provide the initial heat exchange surfaces internal of the heat exchanger portion 34 onto which water 28, supplied into the heat exchanger 34 via the combined fuel and water inflow port 36, can be fed, usually by dripping.

As can be seen from FIG. 4, a dripper head 52 is provided at a distal end of the water inflow pipe 46. It extends into the heat exchanger portion 34 to position outlet holes 56 (better seen in later embodiments) above the plates 50 to drip the water thereon. In this embodiment the outlet holes extend laterally—perpendicular to the axis of the dripper head. For allowing the dripper head 52 to be so installed in the steam generator 22, the plates 50 have apertures 54 through them into which the dripper head 52 is inserted. However, the dripper head 52 might simply be mounted above a top wall of the plates 50.

As can be seen, in this embodiment the apertures 54 in the plates 50 are sized to be larger than the dripper head 52 for both ease of insertion and to prevent direct contact between the plates 50 and the dripper head 52. Such a direct contact would allow conductive heat transfer from the plate 50 to the dripper head 52, which could result in overheating of the dripper head 52 and consequential boiling of the water within the dripper head 52 prior to dripping out of the outlet holes 56 of the dripper head 52. That in turn can create stalling of the water flow through the dripper head 52, and thus pressure variations in the steam output from the steam generator 22, along with the potential for internal deposits within the dripper head (due to the evaporation of the water in the closed space) which ultimately can build up and block the dripper head. All of those symptoms would be unfavourable. The arrangement of the present invention is thus designed to minimise such occurrences of overheating. This then minimises the risk of blockages and minimises any pressure variations or pressure spikes or troughs (as a cessation of water flow will drop the pressure, whereas a restarting of the flow can create an excess of water into the system and thus a spike in steam pressure).

The present invention seeks to feed liquid water on to the plates (or such other heated heat exchange surfaces that might be provided) by attempting to ensure that the water stays as a liquid (i.e. not steam) until inside the heat exchanger and dripping from the dripper head.

In this embodiment, the dripper head 52 has an outwardly projecting structure either side of the outlet holes 56 and a closed distal end. The outwardly projecting structure segregates the two downwardly facing outlet holes 56 to prevent or minimise the risk of pooling of the water as it drips from the outlet holes 56 onto the plates 50 below the holes 56. Therefore, the water will tend to drop or feed directly as controlled drips onto the plate 50 underlying each respective outlet hole 56.

In this embodiment, there are two plates 50 and there are two holes 56. Other embodiments may have more plates than holes if, for example, not every plate is for receiving a feed of water drips. Preferably, the holes are selectively positioned relative to the internal heat exchange surfaces of the steam generator to optimise steam generation.

Figure 5A:
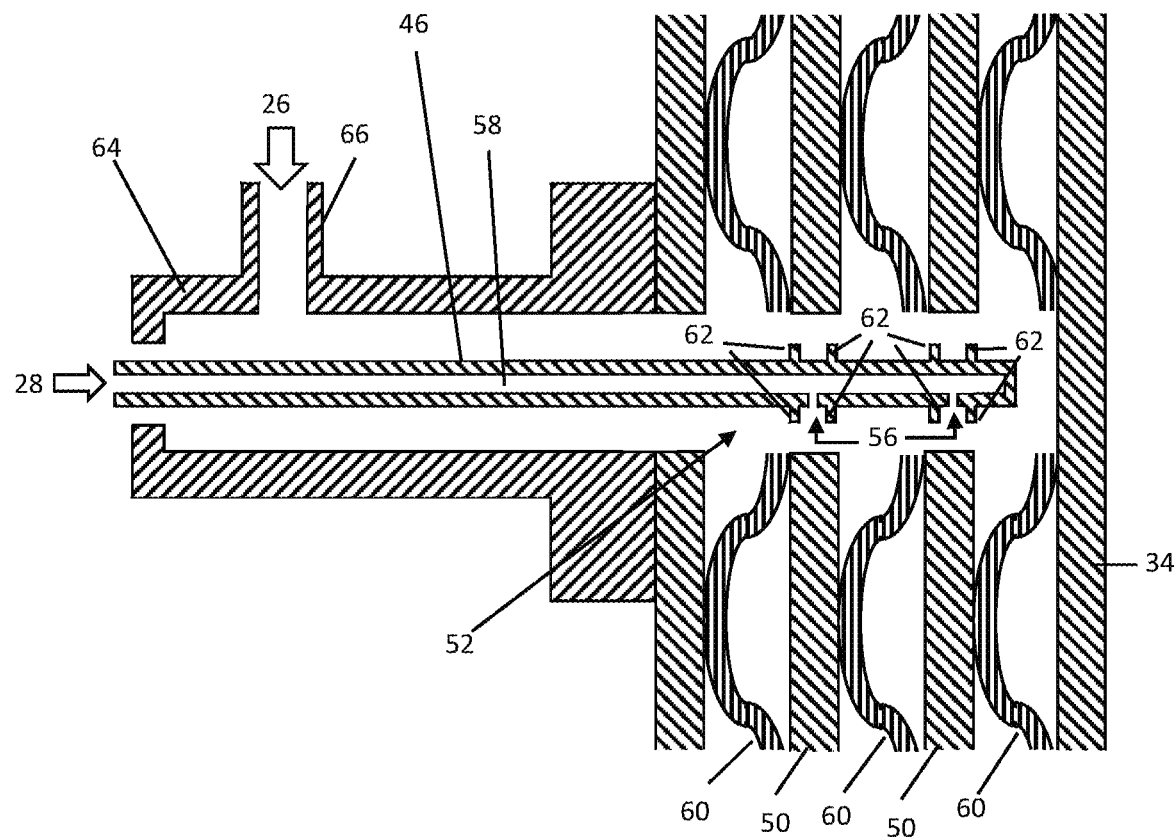
FIGS. 5a and 5b are schematic partial sectional views through two alternative steam generators, showing details of dripper head and water and fuel feeds.
Figure 5B:
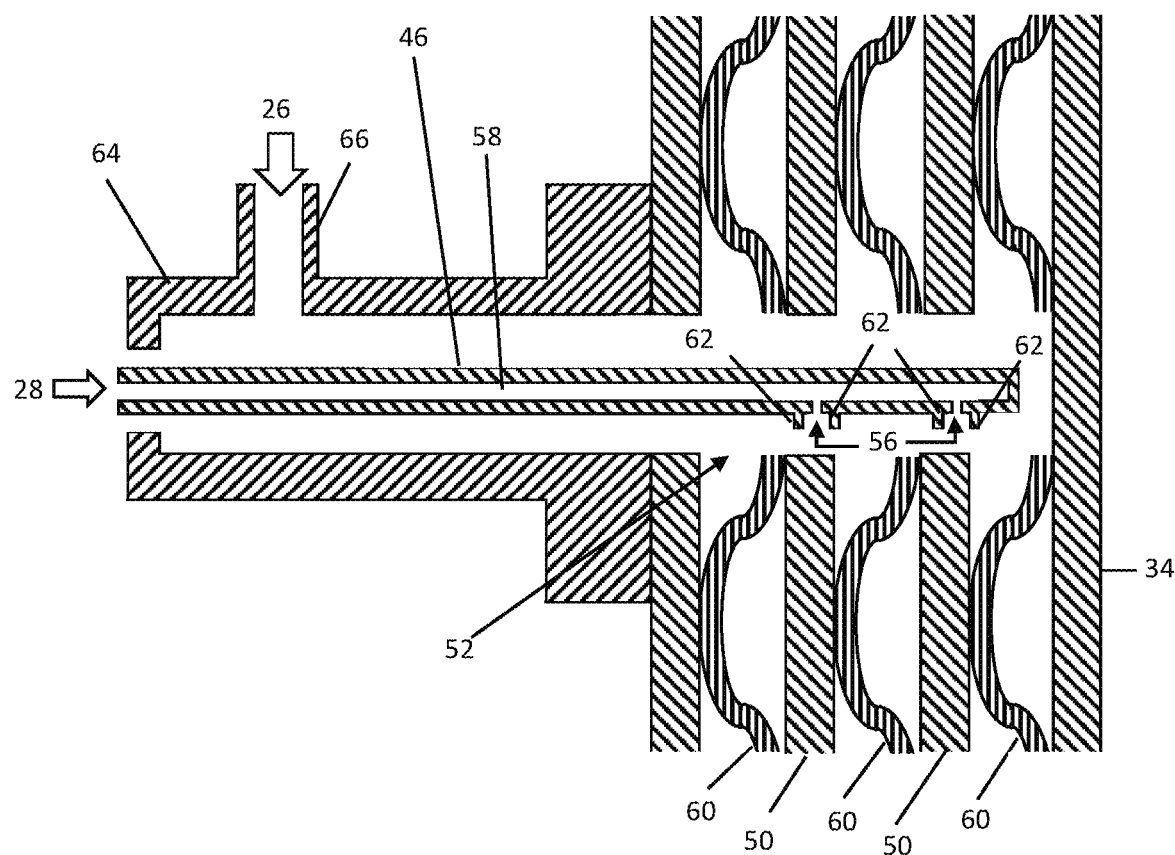

Referring next to FIGS. 5a and 5b, these are schematic partial sectional views depicting two alternative dripper heads 52 inserted into the top of a heat exchanger portion 34 of a steam generator. Each figure shows only a partial section of the heat exchanger portion 34, and two heated plates 50 can again be seen. Furthermore, a dripper head 52 can be seen with outlet holes 56 now being clearly visible on the lower half of the elongate dripper head.

The outlet holes 56 fluidly connect to an internal channel 58 of the water inflow pipe 46 such that inflowing water 28 can feed from a water supply through the internal channel 58 of the water inflow pipe 46 through to the outlet holes in the dripper head 52 and out onto the plates 50. As the plates 50 are hot, upon landing on the plates 50 the water will start to heat up and evaporate to form steam and the steam (and any liquid water) will entrain down through the heat exchanger portion 34 towards the heated steam and fuel gas outflow port 42 (not shown in this figure). During that passage down through the heat exchanger portion 34, the water or steam may travel past fins or other interweaving or non-flat members 60—preferably the water-fuel flow path has multiple interrupts and flow direction changes, generally due to internal fins, to increase the heat exchange area for evaporation, which ultimately promotes a fully mixed outlet stream. These members or fins 60 will also be hot—usually from the heat of the plates 50 to which they connect. Thus, this arrangement ensures a large contact area for the evaporation of the water and thus a rapid steam formation. It also provides a consistent maintenance of the steam pressure within the steam generator such that any pressure pulsations occurring as a result of the water dripping onto the heated surface can be maintained at a low level at the steam outlet 42.

With this preferred convoluted flow-path arrangement, and the dripping of water onto the plates (or other such heat exchange surfaces within the heat exchanger portion) preferably from holes located in selected positions relative to such plates (e.g. directly above), the ability of the steam generator 22 to transiently change its steam production rate quickly and easily is optimised. This may be achieved simply by changing the flow rate of the water (and fuel) into the heat exchanger, whilst ensuring that the water will still fully evaporate by the outlet 42.

Additionally, the fins or non-flat members 60 within the heat exchanger 34 encourage the steam as it is produced to expand in multiple directions, thus evening out any pressure variations within the heat exchanger portion 34, thus again helping to provide low-pressure pulsations. This has a benefit as high pressure pulsation within the heat exchanger 34 results in the reformer 24 receiving a fluctuating steam/fuel mixture—potentially with non-evenly mixed steam and fuel, which would affect the efficiency of the reformer 24. That in turn could also affect the operation of each fuel cell.

The present invention thus seeks to provides low pressure pulsation for creating a uniform and consistent steam and fuel output from the steam generator 22 into the reformer 24. After all, the outflowing stream 30 to be received by the fuel reformer 24 should be a superheated steam-fuel mix containing no liquid water.

The dripper head 52 is designed to drip consistently onto the plates 50, rather than forming pooled water or large droplets. For this purpose, the dripper head has a stepped profile between adjacent holes, with sharp corners between the steps (i.e. different height steps) so configured that surface tension effects discourage droplets from adjacent holes from coalescing. In particular, structures may be provided either side of each outlet hole 56 of the dripper head 52 for segregating the different outlet holes from one another. In the embodiment of FIG. 5a, the structure comprises outwardly extending flanges 62. The outwardly extending flanges 62 are integrally formed onto the dripper head 52, which in turn is integrally formed onto the water inflow pipe 46.

The structures 62 are continuous ring flanges extending around the (entire) periphery (or circumference) of the water inflow pipe 46. They are axially spaced away from the outlet holes 56 by approximately the diameter of the outlet holes, although other distances are possible too. They also extend laterally outward from the outlet holes 56 by a distance of between one and two times the diameter of the hole, although other lengths are possible as well.

In the embodiment of FIG. 5b, the structure also comprises outwardly extending flanges 62 integrally formed onto the dripper head 52, which in turn is integrally formed onto the water inflow pipe 46. However, in this embodiment, the structures only extend around a lower part of the periphery of the water inflow pipe 46. Where the holes are only provided on the underside of the dripper head, gravity and surface tension effects mean that partial flanged structures may be all that is required to confine the droplets, whereas holes provided on the upper half of the dripper head may need to be confined by continuous ring structures.

In the embodiments shown in both FIGS. 5a and 5b, there are two such flanges 62 provided for each outlet hole 56 and there are two such outlet holes 56. Thus, there are four such flanges 62. Also, the flanges 62 extend perpendicular to the central axis of the water inflow pipe 46, or more specifically, the dripper head 52. In this embodiment, the flanges 62 nearest the distal end of the dripper head 52 are spaced from that distal end and the distal end is closed.

Surrounding the water inflow pipe 46, external of the heat exchanger portion 34, is a T-manifold 64. This T-manifold 64 shrouds a part of the water inflow pipe 46 and can be attached to the outside wall of the heat exchanger portion 34 by any conventional means, albeit preferably with a gasket for providing a tight seal there against. The gasket can be an insulating gasket, such as a thermiculite gasket, to minimise conductive heat transfer from the side of the heat exchanger 34 to the T-manifold 64.

The T-manifold 64 has an internal passage with a diameter larger than the water inflow pipe 46 (or the part thereof extending through it). This thus provides an annular gap between the inside wall of the T-manifold and the outside wall of the part of the water inflow pipe 46. This annular gap provides a flow passageway for fuel 26. The fuel 26 enters the T-manifold 64 via a side branch 66. With this arrangement, fuel can enter the heat exchanger portion 34 as a (concentric) shroud around the water inflow pipe 46 to then subsequently mix with the steam generated within the heat exchanger portion 34.

The shrouding of the water inflow pipe 46 with the fuel 26 gives an effect of suspending the water inlet pipe away from any solid surface near the heat exchanger—the water inflow pipe might only be attached at the far left. This prevents any direct conduction of heat from the structure of the heat exchanger 34 into the water inflow pipe 46. This all helps to maintain the water in the water inflow pipe 46 in a liquid state until dripped from the dripper head 52 as the heat from the heat exchanger portion 34 will firstly need to raise the temperature of the fuel 26 before it can raise the temperature of the water 28 within the water inflow pipe 46, but that fuel 26 keeps refreshing from the cooler fuel supply while the steam generator 22 is in operation. As such, with this arrangement the water exiting the outlet holes 56 during operation of the steam generator 22 will tend to drip water from the outlet holes 56 rather than venting steam, thus minimising the occurrence of steam blockages in the water inflow pipe 46 or dripper head 52 (that can otherwise occur—leading to pressure fluctuations), and also it reduces or eliminates evaporation deposits occurring within the dripper head 52 or water inflow pipe 46 which are difficult to clean out, and which can lead to failure of the steam generator 22. The junction i.e. the start of the gas shroud may vary with previous FIG. 3, for example, showing a longer length being shrouded.

With this arrangement of steam generator 22, the water 28 and fuel 26 are not mixed before entering the heat exchanger 34, but become mixed inside the heat exchanger 234 as the water boils and converts to steam. This can have an advantage over premixing the fuel and water—the relatively dry fuel gas flowing through the same passages through the heat exchanger helps to evaporate the water into the gas stream.

Figure 6:
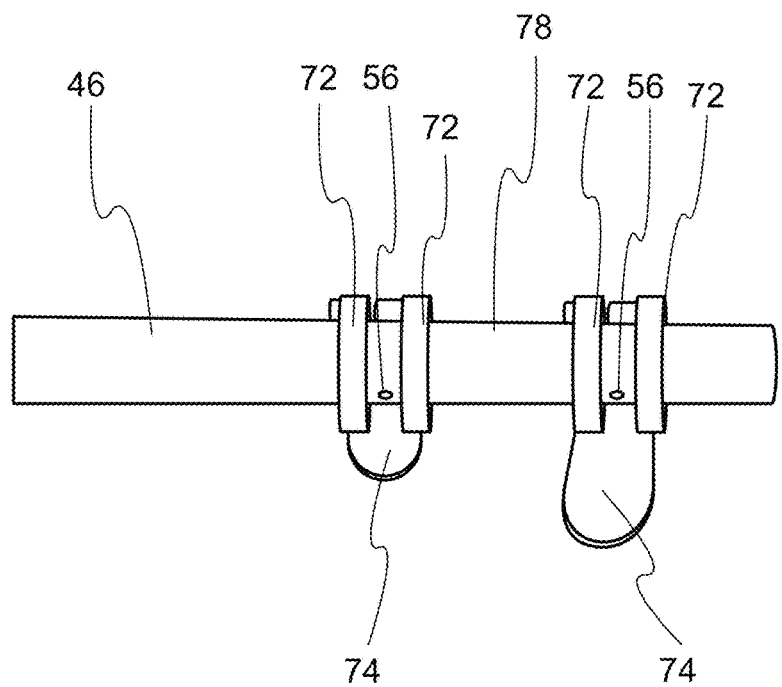
FIGS. 6 and 7 show further dripper head arrangements.

Referring next to FIG. 6, another embodiment of the present invention is shown. Although similar to that of FIG. 5a, in this embodiment, rather than integral flanges 62, pairs of washers 72 are fitted over a pipe so as to be positioned either side of each downwardly facing outlet hole 56, with a gap 78 between the pairs of washers that forms a recessed section relative to the washers. These washers 72 can be push fit over the free end of the water inflow pipe 46.

As can be seen in FIG. 6, water droplets 74 form as the water flows out of the outlet holes 56 but by virtue of surface tension, the drop 74 is held in and spreads around the gap between the adjacent washers 72 either side of the outlet holes 56. In particular, surface tension effects mean that the droplets do not spread around the (sharp corners of the) projecting outer shoulders of the washers into the adjacent gap 78. Whereas in the absence of the washers 72, the drop 74 could spread along the water inflow pipe 46, the washers 72 retain and locate the drops 74 local to the outlet holes 56. Also, because the drops of adjacent outlet holes 56 are held apart and do not combine or mix, their size can be controlled. As a result, the water droplets 74 are not able to combine to create a larger water droplet, which larger water droplet could tend to create increased pressure pulsations within the steam generator if the water were to sit on the exchange surface of the heat exchanger rather than steadily evaporating. Also, by ensuring the droplets grow in a desired position relative to the heat exchange surfaces below, this can prevent them falling in a random manner; for example, they could fall to the side of the plates, and thus land on a different part of the heat exchange surface, and (if large enough) could then potentially drain down through the heat exchanger to pool at the base of the heat exchanger, thus creating a possibility of larger pressure pulsations towards the exit or heated steam and fuel gas outflow port 42 of the heat exchanger portion 34 (as the hottest part is at the bottom—where the heated fluid enters the heat exchanger).

Although the non-flat members 60 within the heat exchanger 34 will tend to resist such liquid pooling, avoiding larger water droplets from the dripper head 52 is still an important feature of the present invention as water pooling can then be substantially eliminated, thus resulting in desirably low-pressure pulsations within the steam generator.

Figure 7:
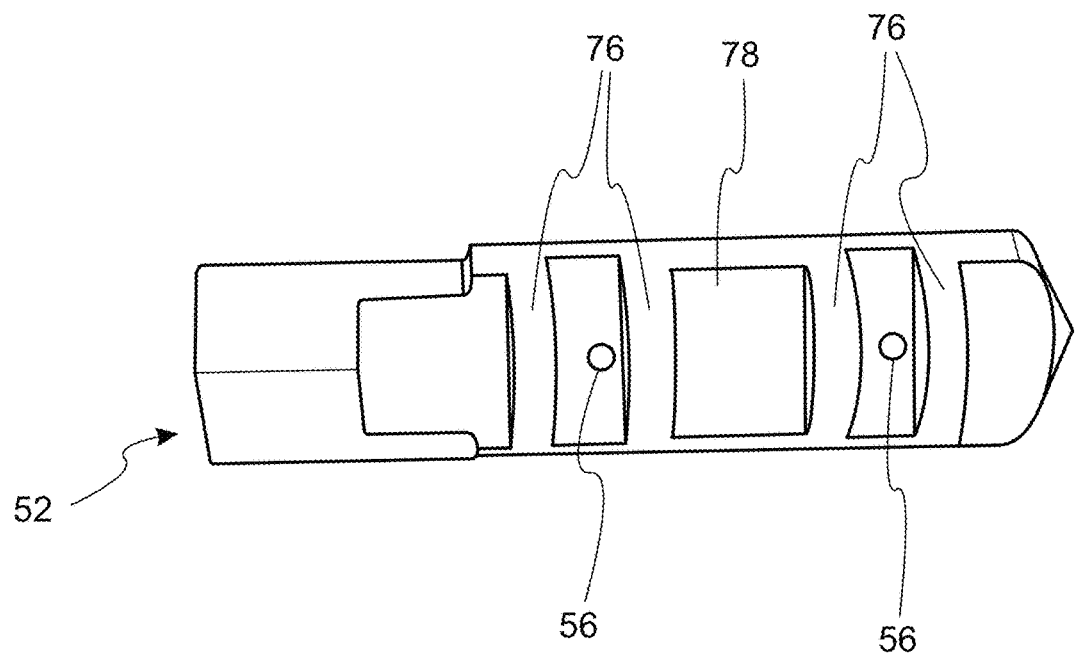

Referring next to FIG. 7, another embodiment of dripper head 52 is shown. In this embodiment, the dripper head 52 is a replaceable dripper head and can be fitted onto an end of the water inflow pipe 46. This might be by way of a threaded end of the water inflow pipe 46 and an internal threaded hole at the proximal end of the dripper head 52. For facilitating tightening of the dripper head 52 onto the thread, the section of the dripper head 52 can be hexagonal like a nut, at least at a part of the dripper head—herein at the proximal end thereof. The hexagonal section enables a spanner to tighten the nozzle onto the water inflow pipe 46.

In this embodiment, outlet holes 56 are again provided on the underside of the dripper head, each with a structure either side thereof, which structure in this embodiment is an arc shaped flange 76 with sharp corners. This dripper head 52 can be fabricated by cutting away portions of the side wall of the dripper head 52, or by moulding. Shoulders either side of the outflow holes 56 are thus provided for containing the water drops, and resisting sidewards spread. In this embodiment the flanges do not extend all the way around the circumference of the dripper head 52, yet they can still perform the same function of preventing joining of the drops from adjacent outlet holes 56, as illustrated in FIG. 6.

In this embodiment, further lateral cuts are provided—one between the two outlet holes 56 so as to create a recess 78 between the two arc shaped flanges 76 that are located between the outlet holes 56 and two more to the outer sides of the other two "outer" arc shaped flanges 76 to define the outsides of the arc shaped flanges 76.

The four arc shaped flanges 76 each located in pairs either side of a respective one of the outlet holes 56 thus have a gap 78 between the pairs, which inner gap helps to ensure that the water droplets between adjacent outlet holes cannot merge together as to do so they would have to bridge that gap.

Figure 8A:
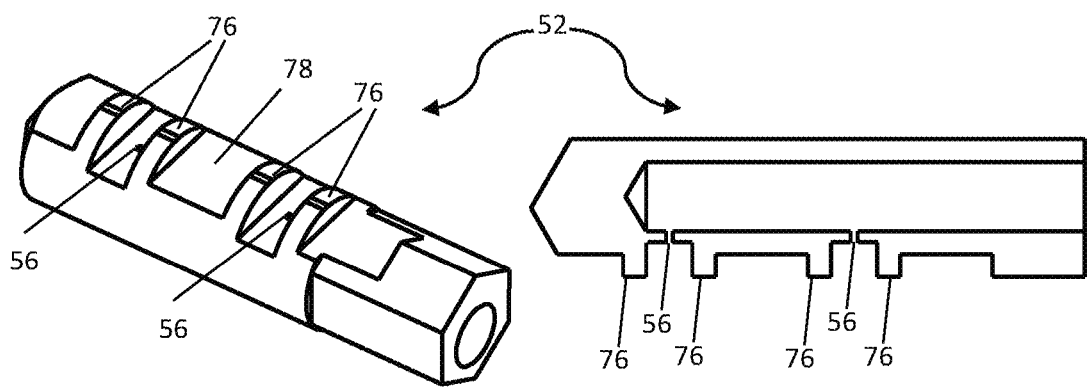
FIG. 8a shows a perspective view and a cross sectional view of the dripper head of FIG. 7, whilst
Figure 8B:
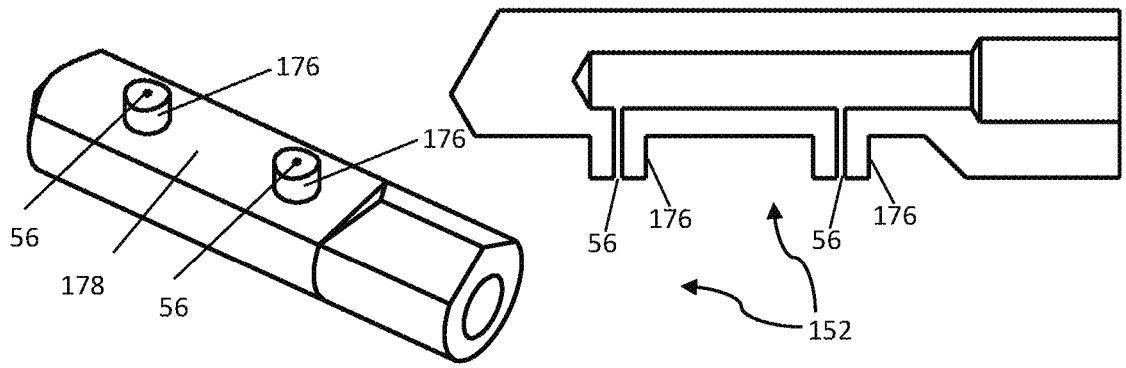
Figure 8C:
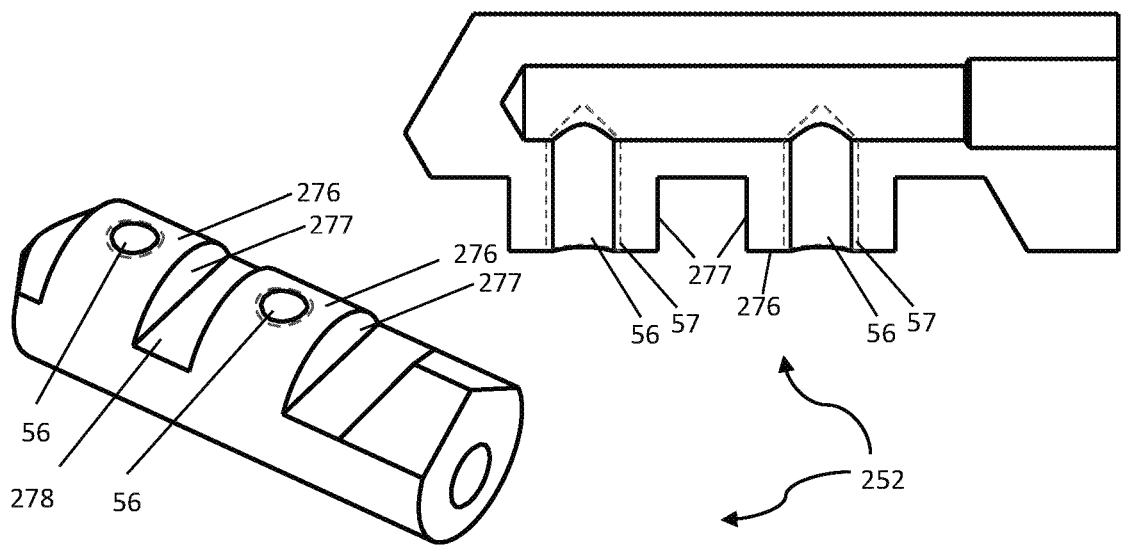

Referring next to FIGS. 8*a* to 8*c*, these show three alternative embodiments of dripper heads, each comprising a perspective view on the left of the underside of the dripper head and a sectional view on the right of the head (rotated through 180 degrees) in its operational orientation with the holes orientated downwards. FIG. 8*a* shows the dripper head 52, as described with reference to FIG. 7, with outlet holes 56 each with a structure either side thereof, which structure in this embodiment is an integrally formed, arc shaped flange 76.

FIG. 8*b* shows a further dripper head 152, which is a variant of the dripper head 52 described with reference to FIGS. 7 and 8*a*. Dripper heads 52 and 152 are substantially similar, and only differences shall be described. Instead of an arc shaped flange, the dripper head 152 of this variant is provided with lateral pipe sections 176 off of the main fluid passageway. Outlet holes 56 are provided in the end of each lateral pipe section. Each lateral pipe section 176 extends downwardly in a lateral or radial direction with respect to the dripper head 152 being a similar depth to the depth of the arc shaped flange 76 of dripper head 52. The end of the lateral pipe section 176 is much larger than the diameter of the outlet hole, presenting a flat end surface or step with sharp corners that project relative to a recessed step or section 178 between the pipe section. The flat end surface on which the droplets form may be selected to be of a suitable size to support the growing droplets, whilst gravity and surface tension effects discourage the droplets from spreading sideways around the sharp corners, and hence, from bridging the gap and coalescing with adjacent droplets in the (higher) recessed section 178. The lateral pipe section 176 is shown as circular in cross section, other cross sections, for example square, pentagonal, or hexagonal may be used.

FIG. 8*c* shows views of a further dripper head 252 that is a further variant of the dripper head 52. Dripper heads 52, 152, and 252 are substantially similar, and only differences shall be described. Instead of an arc shaped flange, the dripper head 252 of this variant is provided with an integral, curved or arc-shaped surface 276 on its underside with arc-shaped, vertical edge surfaces 277 defining sharp corners. The downward facing arc-shaped surface 276 may be a continuation of the circumference of the general cylindrical shape of the side wall of the dripper head 252 and may be formed by cutting away surrounding portions of the side wall of the dripper head 252, or by moulding. Again, lateral side passageways off the main passageway lead to outlet holes 56 provided in the arc-shaped surface 276 on which the droplets can form. Thus, the outlet holes 56 are again provided in downwardly projecting sections 276 of the dripper head 252 defined by sharp corners and again separated by recessed (higher) sections 278 which, through gravity and surface tension effects, discourage the water droplets from adjacent outlet holes bridging the gap 278 and merging together.

As shown in FIG. 8*c*, the outlet holes 56 of dripper head 252 have a large diameter in comparison to those of dripper heads 52 and 152, The larger diameter facilitates customisation of the dripper head 252 by use of a screw thread 57 provided in the outlet holes 56 of the dripper head 252. The screw thread 57 enables customisation of the dripper head outlet holes by insertion of grub screws with a bore, the bore size being customisable to control the flow rate. Likewise, the screw thread may be used to add a pipe section, similar in shape and function to the pipe section 176, to position and tailor the diameter of the outlet holes 56. Alternatively, the outlet holes 56 of dripper head 252 may be holes of similar diameter to the outlet holes shown in FIGS. 8*a* and 8*b*.

The present invention has therefore been described above purely by way of example. Modifications in detail may be made to the invention within the scope of the claims appended hereto.

REFERENCE SIGNS

10 Fuel cell system
12 Stack
14 Fuel cells
16 Electricity output
18 Heated out-gas
18*a* Flow path of out-gas
20 First heat exchanger
22 Steam generator
24 Reformer
25 Syngas
26 Fuel
27 Air
28 Water
30 Heated steam and fuel mixture
32 Heated air
34 Second heat exchanger
36 Water inflow port
38 Heat supply inflow port
40 Heat supply outflow port
42 Heated steam and fuel gas outflow port
44 T-junction
46 Water inflow pipe
48 Fuel inflow pipe
50 Internal heated plates
50 Dripper head
52 Apertures
54 Outlet holes
56 Screw thread
58 Internal channel
60 Fins
62 Flange
64 T-manifold
66 Side branch
72 Washers
74 Water droplet
76 Arc shaped flange
78 Recessed section
152 Dripper head
176 Lateral pipe section
178 Recessed section
252 Dripper head
276 Arc-shaped surface
277 Arc-shaped edge
278 Recessed section The ivnention claimed is:
1. A steam generator for a fuel cell system, comprising:
a heat exchanger with at least one internal heat exchange surface,
a water inflow pipe and a fuel inflow pipe, a dripper head comprising a flow passageway fluidly connected to the water inflow pipe, which dripper head extends inside the heat exchanger above the heat exchange surface for feeding water down onto the heat exchange surface for conversion into steam;
wherein:
the dripper head comprises a plurality of outlet holes spaced along the length of the flow passageway;
between adjacent outlet holes the dripper head has a stepped profile on at least its underside, when viewed in cross-section, to prevent droplets from adjacent holes coalescing;
each outlet hole is segregated from an adjacent outlet hole by at least one baffle that projects outwardly relative to the outlet hole;
the baffle extends at least partially around the circumference or periphery of the dripper head; and
the steam generator is configured so as to combine the fuel with the steam inside the steam generator during use.

2. The steam generator of claim 1, wherein the stepped profile between adjacent outlet holes comprises at least two step surfaces at different heights above the heat exchange surface.

3. The steam generator of claim 2, wherein the adjacent outlet holes are each provided on a step surface, with at least one step surface between those surfaces that is at a different height above the heat exchange surface.

4. The steam generator of claim 3, wherein the adjacent outlet holes are each provided on a step surface which forms part of a structure that projects outwardly towards the heat exchange surface below, the step surface optionally being of a selected size and shape to encourage growth of a droplet of a suitable size, and optionally wherein the adjacent outlet holes are providing in respective projecting structures formed integrally with the dripper head and separated from each other by grooves or channels.

5. The steam generator of claim 1, wherein the baffle extends all the way around the circumference or periphery of the dripper head.

6. The steam generator of claim 1, wherein each outlet hole has a respective pair of baffles associated with it, these being arranged axially along the dripper head on either side of each hole, to segregate it from an adjacent hole.

7. The steam generator of claim 1, wherein the baffle is an integral structure of the dripper head.

8. The steam generator of claim 1, wherein the baffle defines an outwardly projecting arc shaped shoulder.

9. The steam generator of claim 1, wherein the dripper head comprises a tubular end section, and the baffles comprise pairs of washers mounted on the tubular end section, one of each pair being proximal of its outlet hole and the other of each pair being distal of its outlet hole.

10. The steam generator of claim 1, wherein the dripper head is a removable or replaceable component.

11. The steam generator of claim 1, wherein the outlet holes are provided at spaced axial positions along the lower half or underside of the dripper head.

12. The steam generator of claim 1, wherein the fuel inflow pipe has a section mounted coaxially to a part of the water inflow pipe, and optionally wherein the fuel inflow pipe's section surrounds the water inflow pipe's part.

13. The steam generator of claim 1, further comprising a control system configured to deliver liquid water to the outlet holes at a suitable temperature and mass flow rate such that the liquid water forms droplets that drop from the dripper head under gravity, the control system optionally comprising a controller within the steam generator in operable communication with sensors and actuators.

14. A fuel cell system comprising a steam generator according to claim 1, optionally wherein the steam generator comprises a fuel inflow pipe and a combined steam and fuel outlet and optionally wherein a reformer is directly or indirectly connected downstream of the steam generator in the fuel cell system.

15. A fuel cell system according to claim 14, comprising a fuel cell stack, a fuel inflow pipe, an air or oxidant inflow pipe, and an optional reformer connected to the steam generator for providing hydrogen or syngas to the fuel cell stack, the heat exchanger of the steam generator being for taking heated fluid directly or indirectly from an outflow of the fuel cell stack, the heat thereof being used to heat the at least one internal heat exchange surface of the heat exchanger, wherein the at least one internal heat exchange surface is used to generate the steam from the water from the water inflow pipe of the steam generator via the dripper head of the steam generator.

16. A method comprising using a steam generator according to claim 1 in a fuel cell system so as to reduce fluctuations in stack voltage due to fuel side compositional or pressure changes in an incoming fuel/steam mix to a fuel cell stack of the fuel cell system.

17. A method of generating steam using a steam generator as defined in claim 1, wherein water is fed through the water inflow pipe and the dripper head to the heat exchange surface and is converted to steam, and optionally, wherein concurrently fuel is fed into the heat exchanger, wherein the fuel mixes with the steam and is heated.

18. A method of reducing pressure pulsations in a steam generator during steam generation, the steam generator comprising a heat exchanger with at least one internal heat exchange surface; a water inflow pipe and a fuel inflow pipe; and a dripper head comprising a flow passageway fluidly connected to the water inflow pipe, which dripper head extends inside the heat exchanger above the heat exchange surface for feeding water droplets down onto the heat exchange surface for conversion into steam; wherein:
the dripper head comprises a plurality of outlet holes spaced along the length of the flow passageway;
between adjacent outlet holes the dripper head has a stepped profile on at least its underside, when viewed in cross-section, the method comprising adjusting the flow rate of the water to a selected flow rate whereby the stepped profile prevents droplets from adjacent holes coalescing;
each outlet hole being segregated from an adjacent outlet hole by at least one baffle that projects outwardly relative to the outlet hole, the baffle extending at least partially around the circumference or periphery of the dripper head; and
the steam generator combines the fuel with the steam inside the steam generator during use.

19. A method of operating a steam generator for a fuel cell system, the steam generator comprising:
a heat exchanger with at least one internal heat exchange surface,
a water inflow pipe and a fuel inflow pipe,
a dripper head comprising a flow passageway fluidly connected to the water inflow pipe, which dripper head extends inside the heat exchanger above the heat exchange surface for feeding water down onto the heat exchange surface for conversion into steam;
wherein the dripper head comprises a plurality of outlet holes spaced along the length of the flow passageway, between adjacent outlet holes the dripper head has a stepped profile on at least its underside, when viewed in cross-section, to prevent droplets from adjacent holes coalescing, each outlet hole being segregated from an adjacent outlet hole by at least one baffle that projects outwardly relative to the outlet hole, the baffle extending at least partially around the circumference or periphery of the dripper head;

the method comprising:

feeding water through the water inflow pipe to the dripper head;

dripping the water from the dripper head, via the outlet holes, as water droplets, rather than steam or a spray, the water droplets dripping onto the heat exchange surface for conversion into steam; and the steam generator combining the fuel with the steam inside the steam generator during use.

\* \* \* \* \*